Figure 1:
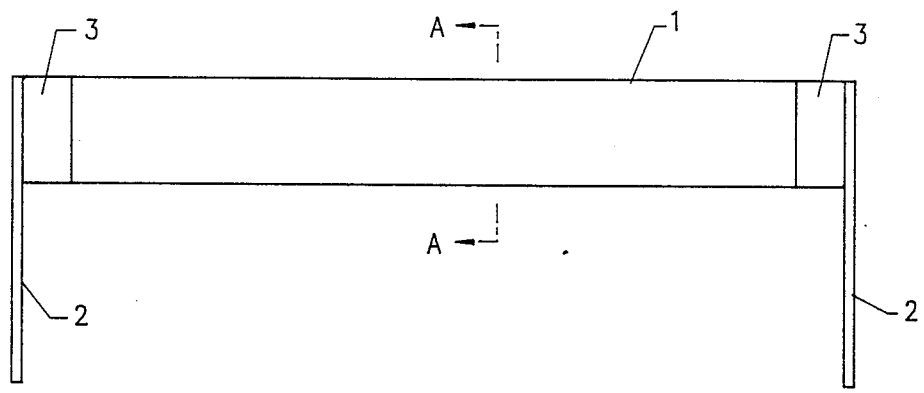

United States Patent [19]

Clarke

[11] Patent Number: 4,912,286

[45] Date of Patent: Mar. 27, 1990

[54] ELECTRICAL CONDUCTORS FORMED OF SUB-OXIDES OF TITANIUM

[75] Inventor: Robert L. Clarke, Orinda, Calif.

[73] Assignee: Ebonex Technologies Inc., Emeryville, Calif.

[21] Appl. No.: 232,954

[22] Filed: Aug. 16, 1988

[51] Int. Cl.[4] .............................................. H01B 1/08
[52] U.S. Cl. ............................ 174/110 A; 174/126.1; 219/548
[58] Field of Search ........................ 174/110 A, 126.1; 219/548

[56] References Cited

U.S. PATENT DOCUMENTS

| | | | |
|---|---|---|---|
| 4,194,022 | 3/1980 | Gillery | 427/109 |
| 4,222,842 | 9/1980 | Bouy et al. | 427/126.6 X |
| 4,422,917 | 12/1983 | Hayfield | 219/288 X |
| 4,431,686 | 2/1984 | Bewer et al. | 427/125 |
| 4,446,245 | 5/1984 | Hinden | 427/126.3 X |
| 4,498,071 | 2/1985 | Plough, Jr. et al. | 219/548 X |
| 4,710,612 | 12/1987 | Lin et al. | 219/548 X |
| 4,772,364 | 9/1988 | Dempsey et al. | 204/98 |
| 4,783,587 | 11/1988 | Ishii et al. | 219/548 |

FOREIGN PATENT DOCUMENTS 1443502 7/1976 United Kingdom .

*Primary Examiner*—Morris H. Nimmo
*Attorney, Agent, or Firm*—Cushman, Darby & Cushman

[57] ABSTRACT

An electrical conductor formed substantially of a titanium sub-oxide having a formula $TiO_x$ where x is less than two. The conductor may take the form of a resistance heater which is compatible with ceramic insulators, and is useful because of its ability to withstand corrosive media and its very low coefficient of thermal expansion.

9 Claims, 1 Drawing Sheet

ELECTRICAL CONDUCTORS FORMED OF SUB-OXIDES OF TITANIUM

This invention relates to an electrical conductor which is formed of an electrically conducting titanium sub-oxide, and to use of such a titanium sub-oxide as an electrical conductor, for example as an electrical resistive heating element.

Structures formed of titanium sub-oxides which have a formula $TiO_x$ in which x is less than 2 have been described for use in electrochemical applications. For example, in U.S. Pat. No. 4,422,917 there is claimed an electrochemical cell incorporating an electrode in which the electrode is formed of a solid coherent bulk titanium oxide having the general formula $TiO_x$ where x is a number in the range 1.67 to 1.9. The electrode is made of a structure comprising sintered particles of titanium sub-oxide. In this patent there is also claimed an electrode consisting essentially of a solid coherent bulk titanium oxide having the general formula $TiO_x$ where x is a number in the region 1.67 to 1.9, and an electrocatalytically active surface on part at least of the surface of the electrode. Many applications of the electrode, and many types of electrochemical cells are described in the patent. For example, the patent describes use of the electrode in a cathodic protection system, as a ground bed electrode, as a bipolar electrode in a chlorate or hyprochlorite cell, and it describes use of the electrode as an anode in metal winning, as a cathode in metal recovery, as an anode in redox reactions, and as an anode and as a cathode in electrosynthesis. The electrochemical cell of the patent may also be an electrode boiler supplied with AC current in order to boil liquids or simply to heat a liquid by passing an electrical current between electrodes of the type described in the patent.

Similarly, British patent No. 1,443,502 describes an electrode for use in a electrochemical process which comprises a base structure of a titanium oxide material having the formula $TiO_x$ in which x is a number in the range from 0.25 to 1.50, the base structure being at least partially covered by a surface coating containing at least one activating substance effective in reducing the voltage drop which would occur, in use, in the absence thereof. In the patent there is described use of the electrode in the electrolysis of aqueous alkali metal chloride solution, in the electrolysis of hydrochloric acid and of water, in cathodic potection, in carrying out organic oxidation and reduction processes, and in fuel cells and in accumulators.

The applications of the titanium sub-oxide which have been described hitherto have been electrochemical applications, and in particular use of the titanium sub-oxide as an electrode. In all such applications electrical current is passed between at least two electrodes at least one of which is formed of a titanium sub-oxide of defined formula. In the applications which have been described hitherto use of a structure formed of a titanium sub-oxide as an electrical conductor per se has not been described, and it is with the use of such a structure as an electrial conductor that the present invention is concerned.

The present invention is based on the observation that a structure which is formed of a titanium sub-oxide can be used as an electrical conductor per se, and that when used as an electrical conductor, the structure possesses a number of advantages when compared with materials, for example metals, which have previously been used as electrical conductors.

For example, a structure which is formed of a titanium sub-oxide possesses a substantial resistance to chemical attack by a variety of chemicals, for example, acids, alkalis, and organic solvents, such that the structure can be used as an electrical conductor in the presence of such chemicals. The electrical resistivity of the structure, and thus the electrical resistance of the structure, may also be varied, for example, by suitable choice of the value of x in the titanium sub-oxide $TiO_x$, such that the structure may be adapted for a variety of uses, for example as a resistive heating element. Furthermore, the titanium sub-oxide has a very low coefficient of thermal expansion, and in particular a coefficient of thermal expansion which may be similar to that of an associated ceramic insulator, such that when used for example as a resistive heating element the structure is compatible with the associated ceramic insulator. On the other hand, a metal will generally have a coefficient of thermal expansion substantially greater than that of a ceramic insulator such that a metal, when used for example as a resistive heating element, may be incompatible with an associated ceramic insulator.

The present invention provides an electrical conductor which comprises a structure formed substantially of a titanium sub-oxide of formula $TiO_x$, where x is less than 2.

The invention also provides a structure which comprises a titanium sub-oxide of formula $TiO_x$ in which x is less than 2, which is in a form suitable for use as an electrical conductor, and which is adapted for connection to a source of electrical power at at least two positions on said structure.

In yet a further embodiment the invention comprises use of a structure which comprises a titanium sub-oxide of formula $TiO_x$, in which x is less than 2, as an electrical conductor. The structure which forms the electrical conductor of the invention may take any specifically configured shape. For example, it may be in the form of a plate, or mesh, or it may be in the form of a wire, rod or tube. The structure may be adapted, for example by means of two or more suitable terminals, for connection to a source of electrical power, which may be a source of alternating current or direct current electrical power. The structure may have a porous form which is particularly suitable in certain heating applications of the electrical conductor, as will be described hereinafter.

The structure may be produced in a number of different ways. For example, the structure may be in the form of particulate titanium sub-oxide contained in a suitable container, for example, particulate titanium sub-oxide contained into a tubular container, which may be of an insulating material. The structure may, for example, be in the form of a wire or rod having an outer sleeve of an insulating material with titanium sub-oxide contained within the outer sleeve. The titanium sub-oxide is preferably tightly packed, and also preferably consists of particles having a suitable size distribution in order to achieve a highly packed structure of the particles and consequently good electrical contact between the particles and thus a structure of low electrical resistivity.

In an alternative and preferred form the structure comprises a solid coherent bulk form of the titanium sub-oxide, that is a structure in which particles of titanium sub-oxide are sintered together.

Particulate titanium sub-oxide may be produced by reduction of particulate titanium dioxide, for example, by heating particulate titanium dioxide in an atmosphere of a reducing gas at elevated temperature, e.g. in an atmosphere containing hydrogen or carbon monoxide at a temperature in the excess of 1000° C., eg at a temperature in the range of 1100° C. to 1500° C., and for a time sufficient to achieve the desired value of x in $TiO_x$. Alternatively, particulate titanium sub-oxide may be produced by heating particulate titanium dioxide in the presence of a solid reducing agent and in a non-oxidising atmosphere, or in a reducing atmosphere. Suitable solid reducing agents include, for example, titanium and also TiN, $TiSi_2$, carbon, Si, TiO and $Ti_2O_3$. After the reduction process has been completed the titanium sub-oxide may be ground to achieve a required particle size.

When the structure which forms the electrical conductor of the invention is a solid coherent bulk form of titanium sub-oxide in which particles of titanium sub-oxide are sintered together the structure may be produced by forming a mass of particles of titanium sub-oxide into a desired shape and heating the mass in a non-oxidising atmosphere and at elevated temperature, eg. at a temperature in excess of 1000° C., in order to sinter the particles. The desired shape may be formed merely by packing the particles of titanium sub-oxide into a suitably shaped container prior to the heating, but it is preferably formed by shaping a composition comprising particulate titanium sub-oxide and water, and preferably an organic material, eg. an organic polymeric material, heating the shaped structure to remove the water, and the organic material if present, from the structure, and furthermore heating the structure as described above to sinter together the particles of titanium sub-oxide in the structure. The use of an organic material in the composition enables a variety of shaping techniques to be used, and it enables structures in a variety of different shapes to be produced readily. The shaping method used will depend on the consistency of the composition.

A fluid composition may be poured into a suitably shaped mould, whereas a more viscous composition may be moulded into a desired shape by plastics processing techniques, for example, by calendering, injection moulding, compression moulding, or by extrusion of the composition. Extrusion is a particularly suitable shaping method to use in the production of an electrical conductor in the form of a wire, rod or tube.

The structure which forms the electrical conductor of the invention may be formed by shaping a composition comprising $TiO_2$, possibly in admixture with water and with an organic material, and heating the shaped structure to remove the water, and the organic material if present, from the structure, and then heating the structure at elevated temperature, eg. at a temperature in excess of 1000° C., in order to sinter together the particles of $TiO_2$. The $TiO_2$ in the sintered structure may then be reduced to the desired titanium sub-oxide by heating in an atmosphere containing a reducing agent, eg. in an atmosphere of hydrogen or carbon monoxide, as herein before described. Alternatively, the composition which is shaped and sintered may comprise $TiO_2$ and a solid reducing agent, as hereinbefore described, and the reduction to the desired titanium sub-oxide may be effected by heating the shaped sintered structure in the presence of the solid reducing agent and in a non-oxidising atmosphere, or in a reducing atmosphere.

The appended drawings illustrate some of the forms which the conductor of the invention may take.

FIG. 1 shows a conductive strip 1 of titanium sub-oxide having wires 2 attached thereto. Areas 3 indicate an area on strip 1 where metal has been plated onto the strip so as to allow attachment of wires 2 to the strip, for example, by soldering.

Figure 2:
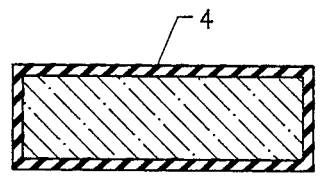

FIG. 2 is a cross section of strip 1 of FIG. 1 taken along line A—A, whereby coating 4 can be seen.

Figure 3:
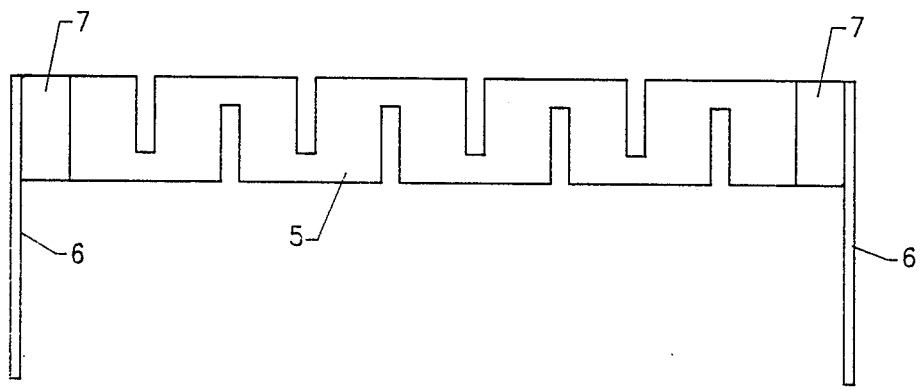

FIG. 3 shows a cut out strip 5, strip 5 also being adapted for connection to a power source via wires 6. Wires 6 are electrically connected to strip 5 via plated areas 7.

The conductivity of the electrical conductor of the invention is dependent inter alia on the value of x in the titanium sub-oxide $TiO_x$ in the structure.

In general the electrical conductivity of the structure formed of titanium sub-oxide decreases as x in the formula $TiO_x$ decreases, although there is not a progressive increase in electrical conductivity, and decrease in electrical resistivity, with decrease in the value of x. For example, as x decreases the electrical conductivity of the titanium sub-oxide increases and reaches a peak at a value of x in the region of 1.7 to 1.85, and thereafter the electrical conductivity decreases with decrease in the value of x, reaching a minimum at a value of x in the region of 1.5 to 1.6. Thereafter, as x decreases the electrical conductivity of the structure increases progressively. The resistance of the structure to chemical attack by a variety of chemicals, including liquid and gaseous chemicals, decreases as x in the titanium sub-oxide $TiO_x$ decreases, and, although x may have a value as low as 0.25, for a good combination of high electrical conductivity and resistance to chemical attack it is preferred that x in the titanium sub-oxide $TiO_x$ in the structure should be in the range of 1.7 to 1.85, particularly where the structure is to be used as an electrical conductor per se. On the other hand, where the structure is to be used as a resistive heating element, the electrical conductivity may not need to be at or near the maximum electrical conductivity of the titanium sub-oxide in the structure, and in this case the value of x in the titanium sub-oxide may be greater than 1.85, provided of course that x is less than 2. The value of x may be as high as 1.98.

The electrical conductivity of the structure formed of titanium sub-oxide is also dependent on the presence of other components in the structure additional to the titanium sub-oxide. Such other components may serve to increase or decrease the electrical conductivity of the structure. For example, the electrical conductivity of the structure may be increased by the presence in the structure of metal in particulate or fibrous form. Other components may be present in the structure in order to change the physical properties of the structure. Such other components include, for example, ceramic materials in particulate or fibrous form.

In general, by choice of the value of x in the formula $TiO_x$, and by choice of other components in the structure, the resistivity of the electrical conductor of the invention may be varied between approximately 10 ohm cm and approximately 1 milliohm cm. For example, where the structure is to be used as an electrical conductor per se, the resistivity of the structure is suitably in the range 1 to 100 milliohms cm, whereas, when the structure is to be used a a resistive heating element, the resistivity of the structure is suitably in the range 100 to 1000 milliohms cm.

The electrical resistance of the structure may be changed by a variety of techniques. For example, the structure, or a part thereof, may be heated in an oxidising atmosphere e.g., in air, in order to oxidise some at least of the titanium sub-oxide in the structure. The heating may be effected, for example, by passing a large electrical current through the structure, or by application of a flame to the structure or to a part thereof. The electrical resistance of the structure may also be changed by forming cuts in the structure, for example by means of a saw.

The structure of the invention which is formed of titanium sub-oxide is suitably adapted for connection to a source of electrical power at at least two positions on the structure. The electrical connection may be by any suitable means. For example, the structure may be plated with a metal and a wire, e.g., of metal, may be soldered or brazed to the metal plating. The structure may have a raised projection or projections to which electrical connection may be made, for example, by means of spring loaded jaw which may be clamped onto the projection, or the projections may be screw-threaded and the electrical connection may be made via a wire, eg. of metal, clamped to the projection by means of a screw-threaded nut on the projection. Alternatively, the structure may comprise a screw-threaded hole or holes adapted to received a corresponding screw-threaded connection.

The structure which forms the electrical conductor of the invention may be used in combination with an electrically insulating material. For example, the structure may be coated with an insulating organic plastic material, e.g., with a material of known type. Alternatively the structure may be used in combination with a ceramic insulating material, and the structure may have an outer layer of such a material. For example, the outer part of the structure may comprise titanium dioxide as an insulating layer. The insulating layer of titanium dioxide may be formed by oxidation of the titanium sub-oxide at or near the surface of the structure, for example, by controlled heating of the structure in an oxidising atmosphere. A structure having an outer layer of a ceramic insulating material is advantageous in that the temperature range over which the electrical conductor of the invention may be used is increased. Thus, in the absence of such an insulating and protective layer, the conductor may tend to lose electrical conductivity at about 350° C. in air; whereas, a conductor which is protected by an outer layer of a ceramic insulating material maintains its electrical conductivity at substantially higher temperatures.

The electrical conductor of the invention may be used as a conductor of the electricity per se, particularly where the conductor has a low electrical resistivity, and the electricity may be alternating current or direct current. However, the electrical conductor is widely applicable as an electrical resistive heating element on account of the ability to vary the electrical resistivity of the conductor and to select a suitable electrical resistivity for the conductor for use in such an application. Use of the electrical conductor as an electrical resistive heating element is particularly beneficial in view of the resistance of the titanium sub-oxide to degradation by a wide variety of chemicals, both liquid and gaseous, such as, for example, acids, alkalis and organic solvents. As a consequence of this chemical resistance the electrical conductor is particularly suitable for use as a resistive heating element even at high temperatures in such chemicals.

The electrical conductor of the invention may have a porous structure, eg. for example a porosity as high as 80%, e.g. a porosity in the range 20% to 80%. Such a porous structure is particularly suitable for use as a resistive heating element as it presents a large surface area to the material with which the element is in contact and which is to be heated by the element.

The invention is illustrated by the following Examples.

EXAMPLES 1 TO 4

A sample of powdered titanium dioxide having a particle size in the range 0.01 micron to 2 microns was mixed with water and charged to a mould and pressed in the mould in order to expel excess water from the composition into the shape of a sheet.

The sheet was placed in an oven at a temperature of 120° C. for 4 hours to dry the sheet and the sheet was then heated up to a temperature of 1100° C. at a rate of increase of temperature of 5° C./minute and the temperature was maintained at 1100° C. for 2 hours to sinter the particles of titanium dioxide in the sheet. Thereafter heating of the sheet was continued in an atmosphere of hydrogen flowing through the oven. The temperature of the oven was increased at a rate of 5° C./minute until a temperature of 1240° C. was reached and this latter temperature was maintained from 6 hours. The sheet was then allowed to cool to ambient temperature in the oven in the atmosphere of hydrogen. The sheet comprised sintered particles of reduced titanium oxide, that is titanium sub-oxide. Samples of titanium sub-oxide removed from the sheet and subjected to chemical analysis showed that the titanium sub-oxide in the sheet had a composition $TiO_x$ where x 1.75.

In four separate examples four strips were cut from this sheet, the strips having the following dimensions.

| Example. | Width cm. | Length cm. | Thickness cm. |
|---|---|---|---|
| 1 | 1.42 | 9.14 | 0.44 |
| 2 | 1.47 | 9.14 | 0.44 |
| 3 | 1.64 | 9.14 | 0.44 |
| 4 | 1.58 | 9.14 | 0.44 |

The ends of each of the strips were plated with a layer of nickel from a bath of nickel sulphamate and copper wires were soldered to each of the nickel plated ends of each of the strips. The length of the current path through each of the strips depended on the length of each strip which had been nickel-plated at the ends thereof, the length of the current path corresponding to the length of each strip which had not been nickel plated.

| Example. | Current path Length cm. |
|---|---|
| 1 | 7.29 |
| 2 | 8.03 |
| 3 | 7.42 |
| 4 | 7.62 |

The resistivity, the resistance of each of the electrical connections to the strips, and the resistance of each of the strips was measured by a Keithley Model 580 Microohmmeter using an Alessi C44-67 four point probe head.

| Example | Resistivity milliohm cm | Resistance milliohm | | |
|---|---|---|---|---|
| | | End 1 | End 2 | Total |
| 1 | 10.33 | 7.01 | 6.63 | 127 |
| 2 | 10.62 | 1.90 | 2.24 | 136 |
| 3 | 11.48 | 4.12 | 1.86 | 123 |
| 4 | 12.57 | 4.28 | 3.05 | 145 |

It can be seen that the strips of titanium sub-oxide connected at the ends thereof to wires and thence to a source of electrical power are eminently suitable for use as electrical conductors.

EXAMPLES 5 TO 7

In each of three separate examples the resistance of two of the nickel-plated titanium sub-oxide conductor strips as described in Examples 1 and 2 was modified by making cuts with a saw into the strips at the 0.44 cm thick edge of each of the strips. Each of the cuts was 0.83 cm deep. The cuts, which were evenly spaced, were made as follows.

| Example. | |
|---|---|
| 5 | 8 cuts at same edge of strip. |
| 6 | 4 cuts at one edge of strip alternating with 4 cuts at opposite edge of strip. |
| 7 | 8 cuts at one edge of strip alternating with 8 cuts at opposite edge of strip. |

The measured resistances of the strips of Examples 5, 6 and 7 were as follows.

| Example. | Resistance milliohm |
|---|---|
| 5 | 223 (127) |
| 6 | 430 (136) |
| 7 | 583 (127) |

For comparison the resistances of the unmodified strips are given in parentheses.

EXAMPLES 8 TO 10

In an alternative method of modifying the resistance of a nickel-plated titanium sub-oxide conductor strip such a strip, having a resistance of 10.33 milliohm, a width of 1.64 cm, a length of 9.14 cm, and a thickness of 0.44 cm, and produced following the procedure described in Example 1, was heated at the centre of one of the 1.64 cm wide faces with the flame from a propane torch for a period of 5 minutes. The heating was conducted in air and resulted in some re-oxidation of the titanium sub-oxide in the strip. The resistance of the thus heated strip was 149 milliohm (Example 8).

The strip which had been heated as described above in Example 8 was then heated on the face opposite to that at which the above heating had been effected. This additional heating was effected in air for 5 minutes with a propane flame at two points either side of the centre of the strip. The resistance of the thus heated strip was 210 milliohm. (Example 9).

The strip which had been heated as described above in Example 9 was then heated in air for 5 minutes with a propane flame at a point at the centre of the strip and between the points at which the heating of Example 9 was effected. The resistance of the thus heated strip was 230 milliohm.

EXAMPLES 11 TO 14

The resistance of a single nickel-plated titanium sub-oxide conductor strip, having a resistance of 12.57 milliohm, a width of 1.58 cm, a length of 9.14 cm and a thickness of 0.44 cm was modified by progressive heating in air to re-oxidise some of the titanium sub-oxide in the strip following the procedure described in Examples 8 to 10, except that each of the progressive periods of heating was of 15 minutes duration and the locations of the heating were as follows.

| Example | Location |
|---|---|
| 11 | Centre of 1.58 cm wide face. |
| 12 | Centre of opposite 1.58 cm wide face. |
| 13 | Centre of both 0.44 cm. thick edges |
| 14 | Centre of 1.58 cm wide face originally heated (in Example 11). |

The resistance of the strip increased progressively with the extent of the re-oxidation of the titanium sub-oxide effected at each stage of the heating, as follows.

| Example | Resistance milliohm |
|---|---|
| 11 | 185 |
| 12 | 228 |
| 13 | 278 |
| 14 | 438 |

EXAMPLES 15 AND 16

In order to demonstrate that re-oxidation of a nickel-plated titanium sub-oxide conductor strip, and thus modification of the strip, may be effected by means of electrical heating of the strip in air such a strip, having a resistance of 7.62 milliohm, a width of 1.58 cm a length of 9.14 cm, and a thickness of 0.44 cm, was connected to a source of electrical power and a current of 20 amps was passed through the strip. The centre of the strip glowed red. The current was passed for 1 minute and then the strip was allowed to cool to ambient temperature. The resistance of the strip was 712 milliohm (Example 15).

In a second example the above procedure was repeated on the strip used in Example 15. The resistance of the strip was then 2.99 ohm. (Example 16).

It should be noted that the conductor of this invention may consist of titanium oxide having the general formula $TiO_x$ where x is less than two. However, the conductor will usually include dopants used for various purposes and will thus comprise a structure formed substantially of $TiO_x$ where x is less than two. Such dopants may include tantalum oxide, niobium oxide, zirconium oxide, lead oxides, antimony oxides or bismuth oxide where appropriate to lower the electrical resistance. Thus it is seen that the invention lies in a conductor of $TiO_x$, where x is less than two, whether said $TiO_x$ is doped or not doped, and regardless of the shape of the structure into which the conductor is formed.

What is claimed is:

1. An electrical conductor having a structure which consists essentially of a bulk titanium sub-oxide of the formula $TiO_x$, where X is in the range 1.7 to 1.85, wherein the structure is coated with an electrically insulating material, said structure being adapted for connection to a source of AC or DC electrical power at at least two positions on said structure.

2. A conductor as in claim 1 wherein said structure is formed as a plate, a tube, a wire, a rod or as mesh, or any specifically configured shape.

3. A conductor as in claim 1 wherein said structure is in porous form.

4. A conductor as in claim 1, wherein said structure comprises a solid coherent bulk form of the titanium sub-oxide.

5. An electrical conductor as in claim 1 wherein said electrically insulating material is titanium dioxide.

6. An electrical conductor as in claim 1 wherein x has a value of 1.75.

7. An electrical conductor as in claim 1 wherein said structure is in the form of a strip of a titanium sub-oxide, and said strip is cut so as to modify the resistance thereof.

8. A resistive heating element having a structure consisting essentially of a bulk titanium sub-oxide having the formula $TiO_x$, where x is greater than 1.85 but not greater than 1.98, said structure being adapted for connection to a source of AC or DC electrical power at at least two positions on said structure.

9. The resistive heating element of claim 8 wherein said structure has a porosity in the range 20% to 80%.

* * * * *